United States Patent [19]

Duenas

[11] Patent Number: 4,682,521
[45] Date of Patent: Jul. 28, 1987

[54] QUICK CHANGE, ADJUSTABLE TOOL HOLDER

[76] Inventor: Oswaldo A. Duenas, 13711 Olympic Ave., Costa Mesa, Calif. 92626

[21] Appl. No.: 827,951

[22] Filed: Feb. 10, 1986

[51] Int. Cl.⁴ .............................................. B23B 29/04
[52] U.S. Cl. ........................................ 82/36 R; 279/6
[58] Field of Search ................... 82/36 R, 36 A, 36 B, 82/36 C; 408/150, 151; 279/6, 51, 52, 53

[56] References Cited

U.S. PATENT DOCUMENTS

| | | | |
|---|---|---|---|
| 2,456,776 | 12/1948 | Faust | 279/6 |
| 2,771,297 | 11/1956 | Nipken | 279/6 |
| 2,793,041 | 5/1957 | Barbier et al. | 279/6 |
| 2,869,879 | 1/1959 | Burton | 279/6 |
| 3,451,686 | 6/1969 | Hammond | 279/51 |
| 4,014,439 | 3/1977 | Kochsiek et al. | 408/151 |

FOREIGN PATENT DOCUMENTS

| | | | |
|---|---|---|---|
| 44-18429 | 8/1969 | Japan | 279/6 |
| 120507 | 12/1947 | Sweden | 279/6 |
| 120541 | 12/1947 | Sweden | 279/6 |
| 846287 | 7/1981 | U.S.S.R. | 279/6 |

Primary Examiner—M. Jordan
Attorney, Agent, or Firm—William J. Kearns

[57] ABSTRACT

A tool holder for cutting tools used on metal cutting lathes which allows for easy adjustment of the tool position with respect to the work to be cut. Provides a simple and rapid means of tool change and adjustment while eliminating the need for extra tools for making the adjustment. Utilizes a manually adjustable collet for positioning and a simple, single lever control for clamping and releasing the tool.

5 Claims, 4 Drawing Figures

QUICK CHANGE, ADJUSTABLE TOOL HOLDER

BACKGROUND OF THE INVENTION

This invention relates in general to tool holders for cutting tools used on metal cutting lathes, and in particular to the type of tool holder which allows for easy adjustment of tool position with respect to the work to be cut.

Lathes are equipped with either a single point tool holder mounted on a compound tool rest on the carriage of the lathe or with a rotary tailstock turret which can hold several tools of various shapes and functions which can be positioned at the work either sequentially or selectively as the lathe operator chooses. Such tool holders can be made with slots and clamping bolts for holding tools with rectangular shanks, or clamps and collets for holding tools with round shanks as found with boring bars and round bars for holding cutting inserts. Many of these holders are so constructed that the tool, when clamped in the holder, is automatically on the center line of the lathe; with use, wear often causes a deterioration of the tool alignment and requires readjustment. At other times it is desirable to mount the tool either above or below the centerline of the lathe to produce the proper cutting conditions for various materials. In spite of the fact that lathes have been in use for hundreds of years, for various reasons such as convenience, economics or reliability, improvements in tool holders are still needed and therefore they are constantly being refined. For example, there have been many refinements in methods for clamping cutting tools with round shanks which use a variety of compound, eccentric collets; however, such designs tend to be expensive to manufacture because of the number of parts. Also such tool holders usually require one or more tools for adjusting the tool setting and thus are sometimes inconvenient to use.

SUMMARY OF THE INVENTION

This invention addresses the problem of providing a simple and rapid means of tool change and adjustment while at the same time eliminating the need for extra tools to make the adjustment.

An object of this invention is, therefore, to provide a quick change, adjustable tool holder which can be mounted either on the compound tool rest of a lathe or on the various positions of a multiple tool, tailstock turret.

It is a further object of this invention to provide a means for manual adjustment of the relationship of the tool with respect to the work being cut, thus eliminating the need for wrenches, shims or special tools.

Another object of this invention is to make an adjustable tool holder with a minimum number of parts.

DESCRIPTION OF THE PREFERRED EMBODIMENT

Figure 1:
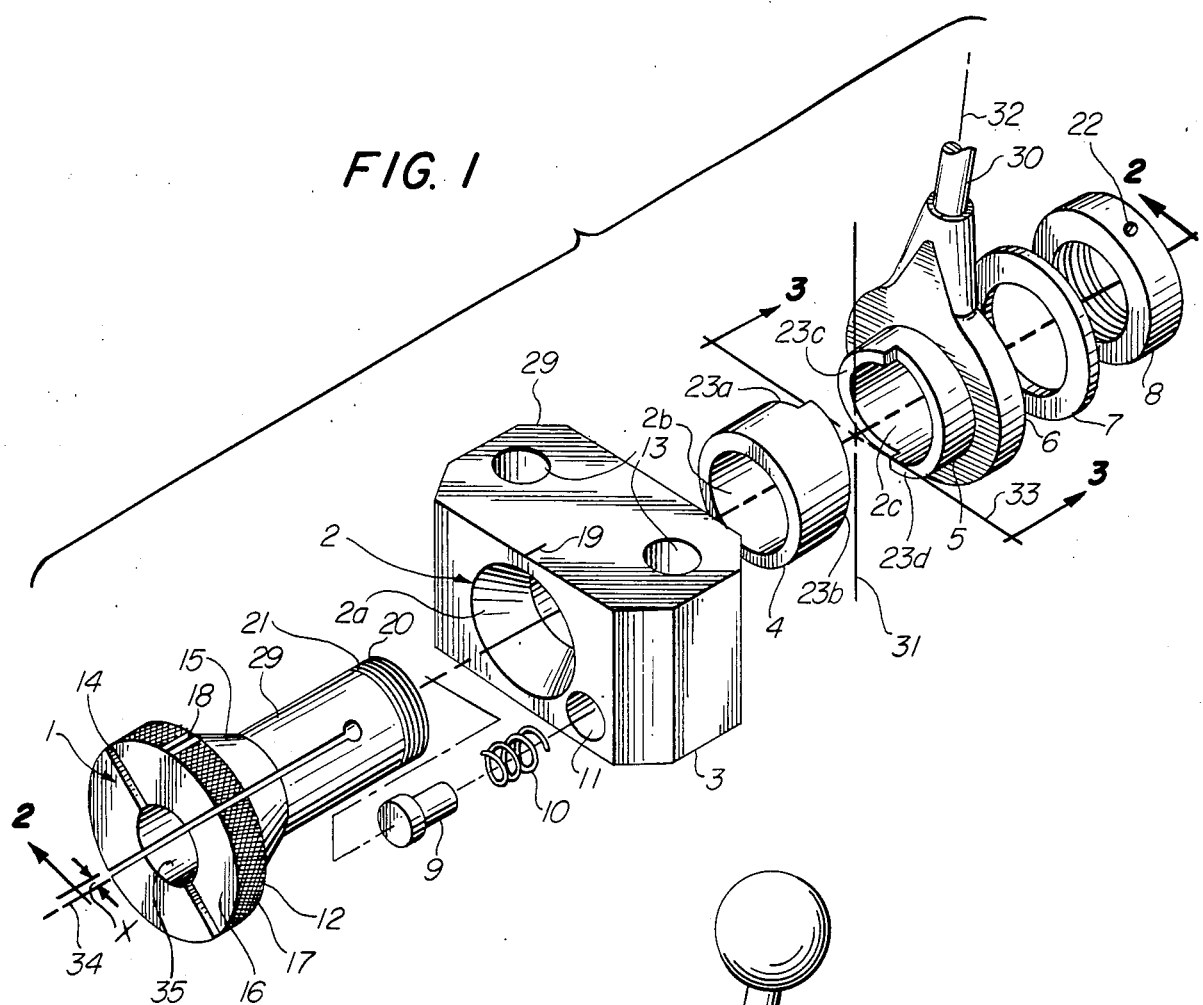
FIG. 1 is an exploded view of the quick change, adjustable tool holder.
Figure 2:
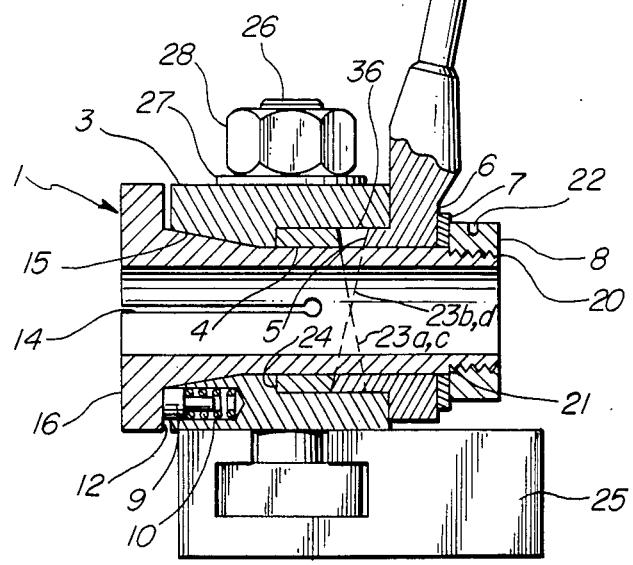
FIG. 2 is a cross sectional view of the tool holder along line 2—2 of FIG. 1 showing the assembled tool holder mounted on a tool post.

Referring now to the drawings, the outer diameter of eccentric collet 1 fits concentrically into bore 2 of body block 3. Bore 2 of body block 3 is defined by tapered entrance bore 2a, inside diameter 2b of fixed cam insert 4, and inside diameter 2c of mating, rotating cam 5 which is part of collar 6 of locking lever 36. Collet 1 extends beyond collar 6 of locking lever 36 far enough to accomodate thrust washer 7 and retaining nut 8. An ejector pin 9 and concentric spring 10 are fitted into hole 11 in the side of body block 3 abutting face 12 of collet 1. Two mounting holes 13 are bored into body block 3 for mounting the tool holder onto tool post 25 and clamping thereto with "T" bolt 26, washer 27 and nut 28. Bevels 29 on body block 3 provide clearance to allow the tool holder to be mounted on a rotary tailstock turret.

Collet 1 closely resembles standard collets in general use for tool holding in that it has a multiplicity of slots 14, a tapered section 15 to provide for closing the collet, and a straight barrel 29, but there are notable differences. The face of collet 1 has been extended and enlarged so that it becomes flange 16 about 0.25 inch (6.5 mm) wide with a diameter such that outer periphery 17 of said flange coincides with the top of body block 3. Periphery 17 is knurled over most of its surface to provide a convenient gripping surface for manually adjusting the position of collet 1 in body block 3; reference mark 18 allows said position to be adjusted with respect to fiducial mark 19 on said top of body block 3. At the end of collet 1 opposite flange 16 is threaded portion 20 of diameter less than the diameter of barrel 29 leaving a shoulder 21 against which retaining nut 8 bears when it is tightened by means of a spanner wrench or equivalent at hole 22. Collet 1 of this invention has an eccentric bore 35 which has a center line 34 displaced from the center line of barrel 29 by an offset distance x; this distance x is somewhat larger than in many eccentric collets to produce the desired adjustment with a single collet. In the preferred embodiment bore 34 is 0.625 inch (15.8 mm) which is a standard tool bar diameter. Offset distance x, or eccentricity, of bore 35 in the instant configuration is 0.17 inch (4.3 mm); since it is seldom necessary to offset a tool more than 0.050 or 0.060 inch (1.3 to 1.5 mm), the offset achievable within the configuration of this invention is more than adequate to meet most machine tool needs. Tool holder bars of smaller diameters may be accomodated by the use of readily available cylindrical split sleeves. It will be apparent to those skilled in the art that the collet can be scaled up or down in size without departing from the spirit of the invention.

Body block 3 could well be a monolithic piece of steel or other suitably hard material made by casting or powder metallurgy techniques. Machining body block 3 from a solid piece of material is another method of fabrication; in this case machining cam surfaces 23 inside block 3 would be difficult and therefore expensive. This difficulty is overcome in the preferred embodiment by inserting cam sleeve 4 into body block 3. The axial position of cam sleeve 4 is determined by shoulder 24 in body block 3. The rotational position of cam surfaces 23a and 23b with respect to some arbitrary reference such as vertical line 31 is determined by the assembly process using a locating pin, for example, and is fixed. When installed in the proper position, cam sleeve 4 can be held in place by brazing, adhesives, shrink or press fitting or other ways known to those skilled in the art.

In the preferred embodiment locking lever 36, consisting of handle 30, collar 6, and rotatable cam sleeve 5, which together lock or release the tool bar in collet 1, are of monolithic construction so as to provide high strength against bending of the lever should the operator use excessive force. However, locking lever 36 may also be fabricated using a cam sleeve similar to cam sleeve 4 as a separate piece fastened into collar 6 in the same manner as fixed cam sleeve 4 is fastened into body block 3. Cam surfaces 23 on sleeves 4 and 5 are identical and are formed by two half diametral planes inclined symmetrically with respect to each other at an included angle indicated by A in FIG. 4. In the preferred embodiment angle A is 20 degrees; however, the planes may be inclined at any other convenient angle to achieve proper camming action. Cam surfaces 23c and 23d are generated by rotating each half of a diametral plane of cam sleeve 5 oppositely about diameter 33 at a right angle to the line of bifurcation between the planes as can be seen with reference to FIGS. 3 and 4. A single planar cut across the cylindrical cam body will also produce a camming effect; however, the use of two symmetrical planes has the advantage of producing balanced cam forces which will reduce the possibility of the moving cam binding in bore 34 in block 3 or on collet 1 as locking lever 36 is rotated. A helicoidal shape such as an acme thread can also be used. For example, a single helix of proper pitch would produce the desired camming action but would be more difficult to machine.

Figure 3:
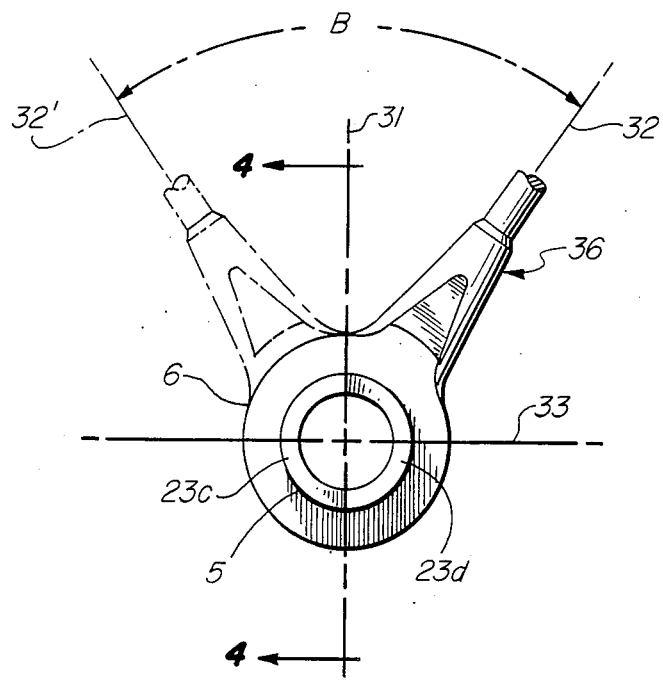
FIG. 3 shows the operating angle of the locking lever about a vertical line through the axis of rotation of the lever.
Figure 4:
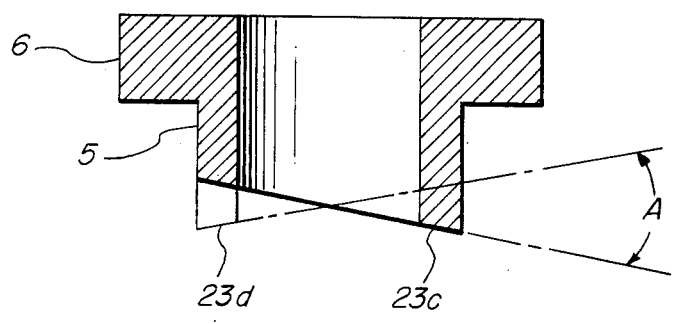
FIG. 4 is a view of the rotatable cam showing the angles of the cam surfaces.

The rotational orientation of cam surfaces 23c and 23d with respect to handle 30 of locking lever 36, and the taper 15 of collet 1, cooperatively determine the size and position of operating angle B, the angle through which locking lever 36 rotates about the axis of collet 1, so that operating angle B will be comfortable for the machine operator. While it is not an operational requirement, in the preferred embodiment operating angle B is closely symmetrical about vertical line 31 passing through the axis of collet 1 for the fully open and fully closed positions of collet 1 as shown in FIG. 3; the geometrical parameters of cam surfaces 23 and taper 15 are chosen for the preferred embodiment so that operating angle B is 70 to 90 degrees. When the quick change, adjustable tool holder is assembled for use, retaining nut 8 on threaded portion 20 is tightened firmly against shoulder 21 of collet 1. The thickness of thrust washer 7 is such that, when locking lever 36 is in the open position, said washer is free. A tool inserted into collet 1 can then easily be adjusted vertically by grasping flange 16 with the fingers and rotating collet 1. When reference mark 18 is aligned with fiducial mark 19 on body block 3, the vertical offset is zero. Rotating collet 1 through 90 degrees in one direction raises the tool above the axis of the lathe by the full amount of offset x, which in the preferred embodiment is 0.17 inch (4.3 mm). Rotating in the opposite direction from said zero point lowers the tool a like amount. Thus it is only necessary to rotate collet 1 through plus or minus 90 degrees to obtain the full range of adjustment; although some horizontal displacement occurs with the vertical movement, it is of no consequence as the horizontal position of the tool is controlled by adjusting tool rest 25 using the cross feed screw on the machine. As locking lever 36 is rotated so as to close or tighten the tool in the collet 1, the action of rotating cam sleeve 5 against mating, fixed cam sleeve 4 forces collar 6 of locking lever 36 to bear against thrust washer 7. Washer 7 in turn bears on locknut 8 and forces collet 1 to close. As collet 1 closes, face 12 of flange 16 pushes against ejector pin 9 and compresses spring 10. When locking lever 36 is moved so as to open collet 1, the forces on cam sleeves 4 and 5 are relieved and the collet opens. The addition of ejector pin 9, which is pushing against face 12 of flange 16 by spring 10, facilitates opening collet 1 as has been done in the preferred embodiment.

What is claimed is:

1. A quick change, adjustable tool holder comprising:
   a manually adjustable collet tool holder, said collet having a multiplicity of longitudinal slots, a manually adjustable knurled flange, a straight barrel section terminating at the end opposite said flange in a shoulder and threading means, and a bore for holding a tool eccentric to said barrel;
   said collet held rotatably in a body block with said block further comprising a fastening means to a machine tool rest, and an internal, fixed cam surface concentric with said barrel;
   said fixed cam surface cooperatively engaged with a mating, rotatable concentric cam surface integral with a collar concentrically surrounding said barrel and penetrating said body block;
   said collar and said collet being held in a rotatable assembly in said body block by a locking ring secured against said shoulder by said threading means on said end of said collet, said collar having a handle attached thereto;
   whereby rotating said rotatable cam surface by means of said handle attached to said collar in cooperative engagement with said fixed cam surface opens said collet to allow manual adjustment of said collet or closes said collet to fix the position of said collet.

2. A quick change, adjustable tool holder comprising:
   a manually adjustable collet tool holder, said collet having a multiplicity of longitudinal slots, a manually adjustable knurled flange, a straight barrel section terminating at the end opposite said flange in a shoulder and threading means, and a bore for holding a tool eccentric to said barrel;
   said collet held rotatably in a body block with said block further comprising a fastening means to a machine tool rest and an internal fixed cam surface, said fixed cam surface formed by a cam sleeve inserted concentrically within said barrel and rigidly attached therein;
   said fixed cam surface cooperatively engaged with a mating, rotatable concentric cam surface, said rotatable concentric cam surface formed by a cam sleeve inserted into said collar and securely fastened thereto, said cam sleeve concentrically surrounding said barrel and penetrating said body block;
   said collar and said collet being held in a rotatable assembly in said body block by a locking ring secured against said shoulder by said threading means on said end of said collet, said collar having a handle attached thereto;
   whereby rotating said rotatable cam surface by means of said handle attached to said collar in cooperative engagement with said fixed cam surface opens said collet to allow manual adjustment of said collet or closes said collet to fix the position of said collet.

3. A quick change, adjustable tool holder as in claim 2 wherein said cam surface consists of two half diametral planes inclined symmetrically with respect to each other, said planes generated by rotating said half diametral planes of said cam oppositely about a diameter of said cam at a right angle to the line of bifurcation between said half diametral planes.

4. A quick change, adjustable tool holder as in claim 3 further comprising a spring actuated ejector pin located in the surface of said body block abutting said knurled flange on said collet and bearing on said flange.

5. A quick change, adjustable tool holder as in claim 4 further comprising a reference mark on said knurled flange opposite a fiducial mark on said body block.

* * * * *